United States Patent
Hahn

(10) Patent No.: US 12,431,554 B2
(45) Date of Patent: Sep. 30, 2025

(54) ADJUSTABLE STRUCTURE AND STATION FOR BATTERY CHARGING AND COOLING

(71) Applicant: Volocopter GmbH, Bruchsal (DE)

(72) Inventor: René Hahn, Karlsruhe (DE)

(73) Assignee: Volocopter GmbH, Bruchsal (DE)

( * ) Notice: Subject to any disclaimer, the term of this patent is extended or adjusted under 35 U.S.C. 154(b) by 492 days.

(21) Appl. No.: 18/071,695

(22) Filed: Nov. 30, 2022

(65) Prior Publication Data

US 2023/0170543 A1 Jun. 1, 2023

(30) Foreign Application Priority Data

Nov. 30, 2021 (EP) ..................................... 21211428

(51) Int. Cl.

| | |
|---|---|
| *H01M 10/613* | (2014.01) |
| *H01M 10/6554* | (2014.01) |
| *H01M 10/6556* | (2014.01) |
| *H01M 50/204* | (2021.01) |
| *H01M 50/242* | (2021.01) |

(52) U.S. Cl.
CPC ..... *H01M 10/613* (2015.04); *H01M 10/6554* (2015.04); *H01M 10/6556* (2015.04); *H01M 50/204* (2021.01); *H01M 50/242* (2021.01)

(58) Field of Classification Search
CPC .......... H01M 10/613; H01M 10/6554; H01M 10/6556; H01M 50/204; H01M 50/242; H01M 10/627; H01M 10/647; H01M 50/209; H01M 50/264; H01M 50/244; B60L 2240/545; B60L 53/80; B60L 53/30; H02J 7/0013
See application file for complete search history.

(56) References Cited

U.S. PATENT DOCUMENTS

| | | | | | |
|---|---|---|---|---|---|
| 4,565,480 | A | * | 1/1986 | Merk | B23Q 7/1431 198/465.1 |
| 8,366,371 | B2 | * | 2/2013 | Maniscalco | H01M 50/204 414/222.07 |

(Continued)

FOREIGN PATENT DOCUMENTS

| | | | | |
|---|---|---|---|---|
| CN | 111900296 | | 11/2020 | |
| CN | 112382823 | * | 2/2021 | .......... H01M 50/244 |
| CN | 113675527 | | 11/2021 | |

(Continued)

OTHER PUBLICATIONS

Machine English translation of CN 112382823 (Year: 2021).*

*Primary Examiner* — Michael L Dignan
(74) *Attorney, Agent, or Firm* — FIG. 1 Patents

(57) ABSTRACT

An adjustable structure for battery cooling having a holding frame (15) for holding at least one battery module, with the holding frame (15) defining a frame plane with a plane normal vector (N1). A cooling plate (16) for battery cooling is provided having at least one cooling surface (16a) with a surface normal vector (N2), and is arranged adjacent said holding frame (15). The surface normal vector (N2) extends parallel to said plane normal vector (N1). A moving mechanism (17, 18) for moving the cooling plate (16) and the holding frame (15) relative to one another in a direction parallel or anti-parallel to the plane normal vector (N1) and to the surface normal vector (N2) is provided and holds cooling plate (16) against the holding frame (15) and/or against a battery module that is held by the holding frame (15).

20 Claims, 5 Drawing Sheets

(56) References Cited

U.S. PATENT DOCUMENTS

2014/0097797 A1* 4/2014 Hendrix ............ H01M 10/4207
                                                              320/118
2020/0168865 A1* 5/2020 Biensan .............. H01M 50/296

FOREIGN PATENT DOCUMENTS

DE      102019218014      5/2021
GB              511125      8/1939

* cited by examiner

ADJUSTABLE STRUCTURE AND STATION FOR BATTERY CHARGING AND COOLING

INCORPORATION BY REFERENCE

The following documents are incorporated herein by reference as if fully set forth: European Patent Application No. 21211428.4, filed Nov. 30, 2021.

TECHNICAL FIELD

The invention relates to an adjustable structure for battery cooling, or for battery charging and/or cooling.

The invention also relates to a battery charging station, comprising at least one such adjustable structure; and at least one battery module, in particular a battery module of cuboid shape.

BACKGROUND

Electric batteries (hereinafter also referred to as a single energy storage unit or multiple energy storage units—ESU) are widely used for driving electrically powered vehicles, including aircraft. They need to be recharged regularly, and certain concepts comprise swapping discharged ESU with fully charged ESU to enable continuous use of the vehicles.

Usually, ESU that were taken out of the vehicle are placed in a (stationary) charging facility. Due to heat generation during charging, the ESU have to be cooled, e.g., by placing them in contact with cooling plates or the like.

There are various solutions for cooling plates and gap fillers (any element or material that is placed between cooling plate and ESU in order to bridge an air gap) to increase the heat transfer between a liquid coolant medium or fluid (e.g., water or water/glycol) and the object to be cooled. However, applicant identified in experiments that there can still be air gaps between the object and the cooling plates, which reduces the heat transfer and therefore the cooling performance.

SUMMARY

This leads to a first object of the invention, i.e., achieving a good contact surface between the object to be cooled and the cooling plates without any air gaps.

Furthermore, the batteries are inserted/extracted into/from the charging and cooling facility, and during this swap some clearance is required to avoid any impact damage of the batteries themselves or the cooling interfaces (cooling plates).

This leads to a second object of the invention, i.e., achieving sufficient clearance between batteries and any cooling surface during battery swap.

These objects are achieved by means of an adjustable structure having one or more of the features described herein.

These objects are further achieved by means of a battery charging station also having one or more of the features defined herein.

Advantageous further embodiments are described below and in the claims.

According to a first aspect of the present invention, an adjustable structure for battery cooling comprises: a holding frame for holding at least one battery module, in particular a battery module of cuboid shape, said holding frame defining a frame plane with a plane normal vector, said plane normal vector preferably extending parallel to opposite faces of a battery module that is held by said holding frame; a cooling plate for battery cooling, said cooling plate having at least one cooling surface with a surface normal vector, said cooling plate being arranged adjacent said holding frame, and said surface normal vector extending parallel to said plane normal vector; a moving mechanism for moving said cooling plate and said holding frame relative to one another in a direction parallel or anti-parallel to said plane normal vector and to said surface normal vector and for holding said cooling plate against said holding frame and/or against a battery module that is held by said holding frame.

Although in practice the adjustable structure will likely comprise more than just one holding frame and more than just one cooling plate, the basic advantage of the invention, i.e., bridging any air gap between cooling plate and battery module can already be observed with the above-defined configuration. Hereinafter, no difference is made between configurations with one battery module and configurations with a plurality of such modules.

Furthermore, the terms "battery module" and "battery" are used as synonyms.

Regarding the shape of the batteries, essentially only the two large sides that come in contact with the cooling plate(s) preferably should be parallel to each other and to the surface(s) of the cooling plate(s), the other sides are less relevant.

Th-e upper and lower sides could also be oblique and/or could adopt a special shape of the holding frame. Essentially, the battery modules define a respective volume with six surfaces or sides, where two opposing surfaces preferably are parallel to each other. An example for this is the above-mentioned cuboid shape.

According to a second aspect of the present invention, a battery charging station, comprises: at least one structure according to said first aspect of the invention; and at least one battery module, in particular a battery module of cuboid shape; wherein said plane normal vector of the holding frame or holding frames preferably extend/s parallel to opposite faces of said battery module when the latter is held by said holding frame; wherein said cooling plate is held against said battery module when the latter is held by said holding frame and when the moving mechanism is in an engaged state; and wherein said battery module is free for withdrawal from said structure when the moving mechanism is in a disengaged state, in which disengaged state said cooling plate is not held against said holding frame and/or against a battery module that is held by said holding frame.

Preferably, the battery modules have flat side walls, and the cooling plate/s provide a flat cooling surface that comes in contact with said flat side walls. This ensures sufficient heat transfer.

Placing the batteries on a moveable holding frame allows to move the batteries laterally, i.e., in a direction parallel or anti-parallel to said plane normal vector and to said surface normal vector, thus reducing or increasing the sidewards clearance between neighbouring batteries. The same can apply for the cooling plates. Furthermore, the lateral movement capability allows to ensure a good contact surface between batteries and cooling plates owing to the lateral force creating a surface pressure when holding said cooling plate against said holding frame and/or against a battery module that is held by said holding frame. Said clearance allows to swap the batteries easily, without inflicting any damage to the batteries and/or to the cooling plates, which can be surface coated for better heat transfer or which can comprise a flexible cooling device.

In other words: a main idea of the present invention is to enable relative lateral movement of individual batteries with respect to each other and with respect to the cooling plates. This can be achieved by arranging said elements on an external frame assembly, e.g., a metal frame assembly.

Although the term "lateral" has been used, the invention is not restricted to any particular orientation in space. For example, the batteries can be stacked horizontally, one beside the other, or vertically, i.e., one lying on top of the other.

In a preferred embodiment, each battery has an upper and a lower "M"-rail, therefore the counterpart in the charging station could be a "V"-rail above and below the ESU, respectively (as part of the holding frames). In this way, the batteries can be inserted in the holding frames in a form fitting manner. However, the invention is not limited to any particular geometrical shape of said rails, as long as they are complementary shaped so that they fit together.

The cooling plates preferably each provide a cooling interface that is intended to come in contact with a corresponding battery module. Advantageously, either aluminum cooling plates with internal conduits for a cooling fluid or any other cooling means, e.g., flexible cooling devices like cooling tubes, or thermoelectric cooling devices like Peltier elements, on a simple holding plate can be used.

For battery insertion and extraction, in an embodiment said rails (as part of said holding frames) and said plates can be moved laterally one by one by the moving mechanism, thereby increasing the lateral clearance between one cooling interface and an adjacent one. In a preferred embodiment with several holding frames, a central holding frame, e.g., V-rail-frame, can be fixed and thus will not move. This ensures sufficient space to perform the battery swap (either with equipment or manually) without the danger of a collision between battery and cooling interface. Then the cooling plates and V-rail frames (holding frames) can be moved laterally inwards again (towards one another) until all air gaps between a given ESU and its respective cooling interface (cooling plate) are closed. Furthermore, the moving mechanism can apply some lateral pressure that is sufficient to hold the ESU in place, i.e., avoid that they move back and forth on the V-rails (holding frames).

Said moving mechanism can include a mechanical and/or electrical drive or drive unit. This drive unit can comprise and drive a spindle (screw) or shaft, which is preferably installed perpendicularly across all ESU.

In an embodiment, the spindle is connected to two moving plates that are located at respective end of the holding frame/cooling plate arrangement. A lower element of each moving plate has at least one threaded hole, i.e., when the spindle rotates the moving plates move in lateral direction and press the ESU together. To this end, preferably the spindle has a portion with right-hand thread and a portion with left-hand thread.

However, in an alternative embodiment only one such moving plate is used, and the holding frame/cooling plate arrangement is fixedly attached to an external structure (frame assembly) on the other side opposite said one moving plate.

The holding frames can be arranged movably on at least one additional guiding rail that ensures a smooth movement of the sliding battery frames (holding frames) and the cooling plates. Furthermore, said at least one guiding rail represents a load path for the weight of the battery units etc.

In a preferred embodiment, said moving plates as described above can only create an inward movement of the battery frames (holding frames) on the cross-rails (i.e., pressing the ESU together).

For to achieve the opposite (outward) movement, in a further embodiment lugs are attached to the moving plates and to the battery frames (holding frames), preferably to an upper side thereof, which lugs connect one holding frame to its (outwardly) adjacent neighbour and finally to said moving plate on each side or on said one side (in the case of only one moving plate) of the assembly. These lugs are preferably fixedly attached on a given holding frame and have a long hole (elongated hole) with a bolt through it on an adjacent holding frame.

Hence, when a moving plate moves outwards due to a rotating spindle, the moving plate will pull the adjacent battery frame (holding frame) outwards, then this frame will pull its inwards adjacent neighbouring frame also outwards and so forth, until finally the "open" position for all holding frames is reached. This state can also be referred to as a disengaged state, whereas a state, in which the ESU, holding frames and cooling plates are pressed together, can be referred to as an engaged state.

Most preferably, in an embodiment the cooling plates do not directly slide on the cross-rails, i.e., the at least one guiding rail, but are attached to the holding frames, e.g., with bolts and springs (preferably, but without limitation, one cooling plate per holding frame). Thereby, as soon as the moving plates induce an outward movement of the holding frames, the springs will "push away" the respective cooling plates from the ESU (and/or from the holding frames) thus providing the required clearance for battery extraction from the charging station. Further, the springs allow that the cooling plates will be pressed against the ESU automatically by just moving the battery frames laterally closer together.

Alternatively, the cooling plates need not be attached to a holding frame (via springs or the like), but could be arranged on respective separate holding frames which move on the same guiding rails as the battery holding frame(s) and are also connected via the above-described lugs (for opening).

As stated, the invention can be applied to batteries that are stacked vertically on top of each other instead of side-by-side, therefore not requiring lateral movement but vertical movement.

The cooling plates are not limited to a particular cooling technology. For instance, a flexible (plastic) volume that blows up when liquid coolant is pumped through it and thereby compensates any lateral clearance (and air gaps) between batteries and cooling interface (cooling plates) could also be used. Preferably, one can use the above-described adjustable structure in addition to a flexible cooling device, since the latter can only compensate a few millimetres of lateral clearance when filled with liquid coolant, which may not be sufficient in all use cases.

In summary, the following embodiments of the invention have proved particularly useful and advantageous:

In one particular embodiment of the structure according to the invention said holding frame and said cooling plate are movably arranged within an external frame assembly. This ensures stability of use and provides the required load paths.

In one particular embodiment of the structure according to the invention, said structure further comprises a first plurality of holding frames extending parallel to each other, each holding frame for holding at least one battery module; a second plurality of cooling plates extending parallel to each other, each of said cooling plates being arranged on a respective holding frame; said moving mechanism devised for moving said cooling plates and/or said holding frames relative to each other in a direction parallel to said surface normal vector thus changing a distance between neighbouring cooling plates and/or between neighbouring holding frames; preferably said first plurality being equal in number to said second plurality. In this way, the number of batteries that are cooled at a given time can be increased.

In another particular embodiment of the structure according to the invention said holding frame or said holding frames is/are devised for slidably inserting therein a battery module in a direction transverse to said plane normal vector, said holding frame or said holding frames preferably having a C-shape or a U-shape, so that a battery module is insertable between parallel free legs of such C-shaped or U-shaped holding frame. Such shape has proven particularly well suited in practical use.

In yet another particular embodiment of the structure according to the invention said cooling plate or said cooling plates has/have an internal flow conduit for a fluid cooling medium or is/are equipped with a preferably flexible flow conduit for a fluid cooling medium on its/their surface facing a respective holding frame. Preferably, there is also provided the necessary tubing for supplying the fluid to the cooling plates and back to a heat exchanger or the like. In this way, the cooling performance can be increased.

In yet another exemplary embodiment of the structure according to the invention the cooling plate or said cooling plates are devised as thermoelectric cooling plates, where the cooling is provided by Peltier elements.

In still another embodiment of the structure according to the invention the at least one cooling plate is provided with an internal flow conduit and is made from a material of good thermal conductivity, e.g., metal, in particular aluminum, and/or is coated with such material. This can further improve cooling performance.

In highly preferred embodiment of the structure according to the invention said moving mechanism is devised for to move a first number of holding frames to one side away from a central holding frame among said plurality of holding frames and to move a second number of holding frames to another side away from said central holding frame among said plurality of holding frames, while not moving said central holding frame, preferably said first number being equal to said second number. In this way, the time needed to free the batteries for swapping can be shortened.

In another preferred embodiment of the structure according to the invention said moving mechanism comprises a screw drive or spindle drive having a driving motor and a lead screw or spindle, said holding frame/s—apart from said central holding frame—being drive-coupled to said lead screw or spindle. This has proven to be a very easy and cost-efficient way of devising the moving mechanism.

In another highly preferred embodiment of the structure according to the invention said lead screw or spindle has a first portion with right-hand thread and a second portion with left-hand thread; and a central holding frame is located on said lead screw or spindle in a region between said first portion and said second portion. In this way, the above-mentioned shortening of swap time can be achieved while said central holding frame remains stationary.

In still another preferred embodiment of the structure according to the invention said cooling plate or a respective cooling plate is attached to said holding frame or to a respective holding frame by means of a spring mechanism, which spring mechanism is devised for separating a given cooling plate from a corresponding holding frame in a disengaged state of said moving mechanism, in which disengaged state said cooling plate is not held against said holding frame and/or against a battery module that is held by said holding frame. The spring mechanisms ensure good contact during cooling while enabling efficient disengagement and lateral separation during swapping.

In an advantageous embodiment of the structure according to the invention respective neighbouring holding frames are interconnected by interconnecting means that have a hysteresis effect concerning a mechanical coupling between said neighbouring holding frames, so that when one of said neighbouring holding frames is moved by the moving mechanism, the other one of said neighbouring holding frames will follow a corresponding movement with a time delay. In this way, the batteries can be freed successively one after the other. This concept can be extended to the cooling plates, as described above.

Preferably, this effect is used only for opening the mechanism; for closing the structure, the cooling plates and the holding frames with the ESU are pressed against each other laterally.

In another advantageous embodiment of the structure according to the invention said neighbouring holding frames are interconnected by at least one flexible element, e.g., a tension belt, having some slack in a direction parallel to said surface normal vectors or by at least one lug having an elongated hole, which hole is elongated in a direction parallel to said surface normal vectors. These are easy and cost-efficient ways of achieving the above-mentioned hysteresis effect.

In yet another advantageous embodiment of the structure according to the invention at least one holding frame of the two outermost holding frames is connected to a respective outer plate (or moving plate) by means of at least one of said interconnecting means; and the moving mechanism directly acts on said outer plate. This has proved to be an efficient way of reducing said moving mechanism to practice.

In still another advantageous embodiment of the structure according to the invention said holding frame or said holding frames has/have an engaging structure, preferably on said parallel free legs of the above-mentioned C-shaped or U-shaped holding frames, which engaging structure preferably is complementary to a complementary engaging structure of a battery module. This helps to securely hold the batteries during cooling.

A further embodiment of the structure according to the invention can comprise at least one electrical connector for charging of batteries, preferably at least one such electrical connector per holding frame, wherein said electrical connector preferably is devised as a flexible cable connector, most preferably with a connecting plug. In this way, the same structure can be advantageously used for both charging and cooling (during charging) of the batteries. In the case of cable connectors, enough slack can be provided to compensate or to account for any (lateral) movement of the batteries. In this way, they can be first connected electrically, before activating the moving mechanism in said engaged state.

In a further embodiment of the structure according to the invention said holding frame or said holding frames are arranged on at least one guiding rail, preferably at least two parallel guiding rails, most preferably at least two parallel guiding rails above and at least two parallel guiding rails below said holding frame/s, which guiding rail or guiding rails is/are preferably attached to the above-mentioned frame assembly. As stated before, this ensures stability and provides load paths.

In a further embodiment of the battery charging station according to said second aspect of the invention, the battery charging station comprises a reservoir of a cooling fluid in fluid connection with the above-mentioned flow conduit. This may advantageously comprise a heat exchanger for refreshing the fluid (coolant). Further included can be suitable fluid serving means, such as a pump.

In another embodiment of the battery charging station according to said second aspect of the invention, the battery charging station further comprises an electrical power source for charging the at least one battery module, said power source in electrical connection with the above-mentioned electrical connector. This provides the necessary features for charging and cooling said at least one battery (module).

In yet another embodiment of the battery charging station according to said second aspect of the invention the at least one battery module has a complementary engaging structure, said complementary engaging structure being complementary to an engaging structure of said holding frame or said holding frames, preferably on said parallel free legs of said C-shaped or U-shaped holding frames, most preferably said complementary engaging structure being M-shaped in cross section and said engaging structure being V-shaped in cross section, or vice versa. This has been explained before and provides holding stability for said battery module/s. The invention is nevertheless not limited to the above-mentioned geometrical shapes.

BRIEF DESCRIPTION OF THE DRAWINGS

Further features and their advantages can be gathered from the following description of exemplary embodiments of the present invention.

DETAILED DESCRIPTION

Figure 1:
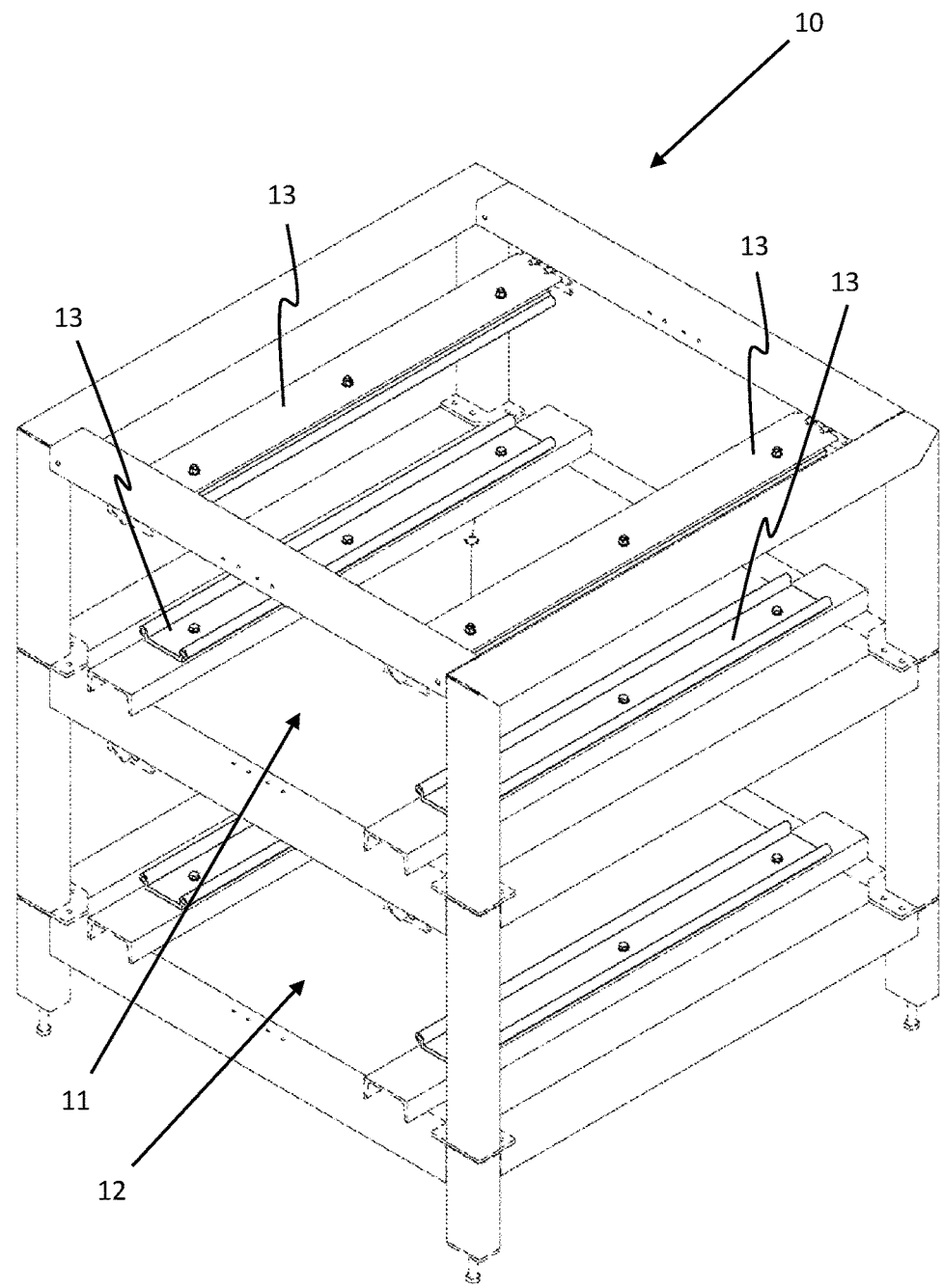
FIG. 1 shows a perspective view of a frame assembly used in connection with the present invention.

FIG. 1 shows a frame assembly 10 as can be used in one embodiment of the structure according to the invention. The frame assembly 10 has two stories or levels 11, 12 which can be used for arranging battery modules. On each of the levels 11, 12, four guiding rails 13 are arranged, each extending parallel to each other, whereby two guiding rails 13 are always arranged vertically opposite and facing each other.

The invention is by no means limited to the frame arrangement 10 shown, but may deviate therefrom, in particular with regard to the number of levels 11, 12 and/or the number of guiding rails 13.

Figure 2:
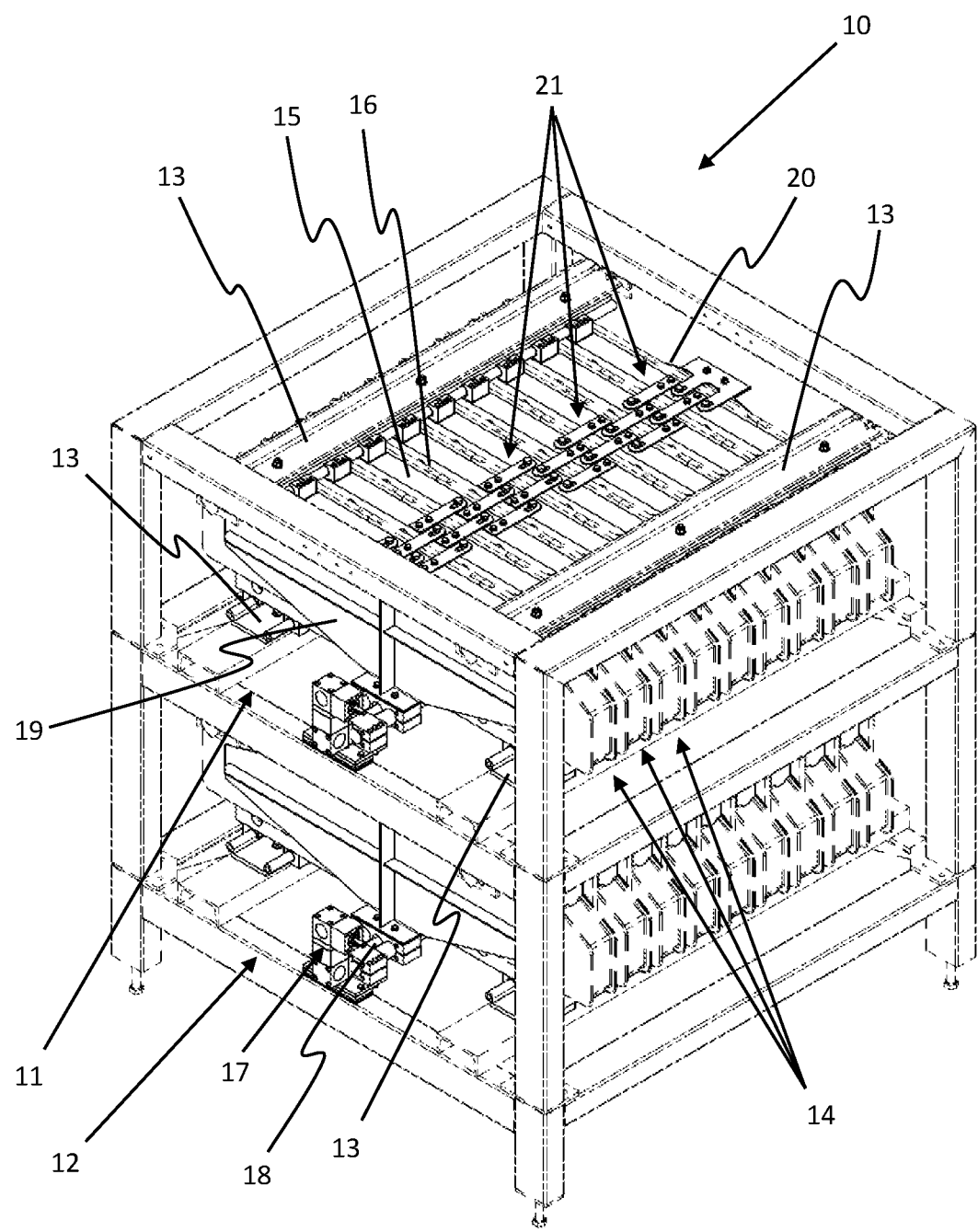
FIG. 2 shows the frame assembly of FIG. 1 with further elements of the structure according to the invention.

FIG. 2 shows the frame assembly 10 of FIG. 1, in which a plurality of battery modules 14 are arranged on each level 11, 12, which will be discussed in more detail below. The battery modules 14 are each arranged in a holding frame 15, to which a cooling plate is attached at reference 16. For reasons of clarity, this is only explicitly designated for one battery module 14 in FIG. 2. The holding frames 15 are movably mounted on the guiding rails 13, i.e., displaceable in the direction of the guiding rails 13. Reference sign 17 shows a spindle drive which cooperates with a spindle 18 to move the battery modules 14 or the holding frames 15 with the cooling plates 16 along the guiding rails 13. In other words: spindle drive 17 and spindle 18 form a moving mechanism for moving said cooling plates 16 and said holding frames 15 relative to one another. For this purpose, the spindle drive 17 acts via the spindle 18 on a respective outer moving plate 19, 20, which are each arranged endwise with respect to the arrangement of the battery modules 14. The spindle 18 is preferably a spindle with two opposing threaded portions, so that the moving plate 19 is movable in the opposite direction to the moving plate 20.

The holding frames 15 are connected to each other between adjacent holding frames 15 and to the movement plates 19, 20 via lugs 21, which will also be discussed in more detail below. In this way, the movement can be transferred from the movement plates 19, 20 first to the immediately adjacent holding frames 15 and then from there successively to all other holding frames 15. In this way, the holding frames 15 and with them the cooling plates 16 can be moved away from each other or towards each other along the guiding rails 13—depending on the direction of rotation of the spindle drive 17—in order to bring the cooling plates 16 into contact with the battery modules 14 for cooling purposes or to separate them from the battery modules 14 for removal thereof.

Figure 3:
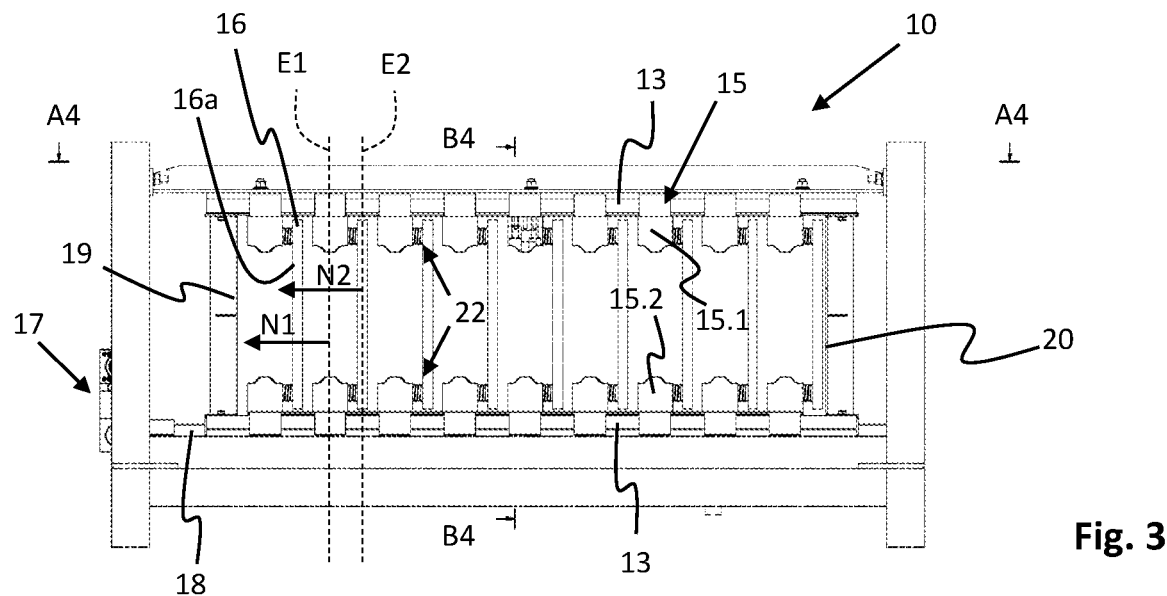
FIG. 3 shows a front view of the embodiment of FIG. 2.

FIG. 3 shows a front view of one plane of the arrangement in FIG. 2, looking transversely to the guiding rails 13. It is clearly visible that the individual holding frames 15 can—in principle—be designed as open frames which have only an upper holding profile 15.1 and a lower holding profile 15.2. Alternatively, the holding frames 15 can also be designed as C-frames or U-frames and be closed at one end, which is not shown in the drawing. Please note that in a design with open holding frames 15 as mentioned above, a second spindle on the top rails would be necessary for moving the upper holding profiles 15.1, which is not shown in the figures. The profiling of the retaining profiles 15.1, 15.2 will be discussed in more detail below.

The upper retaining profile 15.1 and the lower retaining profile 15.2 are each movably connected to two of the guiding rails 13. The holding profiles 15.1, 15.2 span a first plane (frame plane) E1 with a (frame) normal vector N1. A cooling plate 16 is arranged parallel to this first plane E1 and defines—with its cooling surface 16a—a second (surface) plane E2 with a (surface) normal vector N2. Here, the normal vectors N1 and N2 extend parallel to each other. The movement mediated by the spindle drive 17 is such that the holding frames 15 and the cooling plates 16 move in the direction of the normal vectors N1 and N2 or in the opposite direction towards or away from each other, depending on the direction of rotation of the spindle drive 17 and on the spindle thread. In order for the cooling plates 16 to also move away from the holding frames 15 in this context, each of the cooling plates 16 is connected to the associated holding frames 15 via a spring mechanism 22, so that when the holding frames 15 move away from each other, the respective cooling plate 16 is also spaced apart from the associated holding frame 15, as shown in FIG. 3.

No battery modules are shown in FIG. 3.

Figure 4:
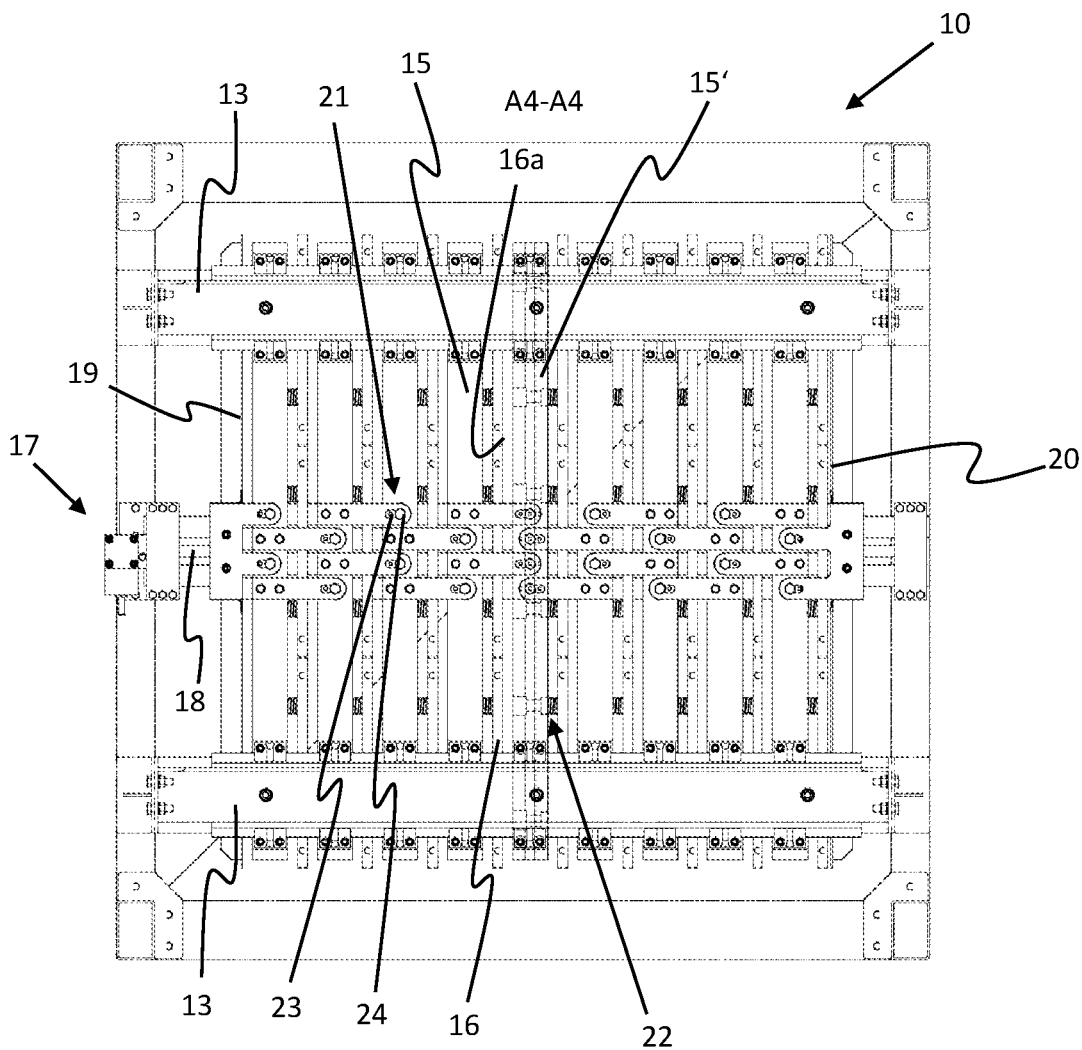
FIG. 4 shows a top view of the embodiment of FIG. 2.

In the top view according to FIG. 4 (cf. line A4-A4 in FIG. 3), it can be seen in particular that the central holding frame with reference sign 15' is designed to be fixed and does not move along the guiding rails 13 when the spindle drive 17 is actuated. First, as already described, the moving plates 19, 20 move outwards on the guiding rails 13 and in doing so successively take the holding frame 15 with them from the outside inwards via the lugs 21. Each lug 21 is firmly connected at one end to a holding frame 15 and has an elongated hole 23 at its other end, which acts to collect with a bolt 24 on an adjacent holding frame 15. Due to the elongated hole 23, there is a certain delay or hysteresis effect.

When the spindle drive 17 is actuated in reverse, the holding frames 15 move inwards again from both sides towards the fixed holding frame 15', pressing the cooling plates 16 against the respective holding frame 15 or 15' against the spring action (at 22). If a (cuboid) battery module (not shown here) is now arranged in each of the holding frames 15, 15', its side walls will come into contact with the cooling plate 16 and in this way experience a cooling effect, in particular during a charging process. For this purpose, the cooling plates 16 can either have an internal channel system for passing a cooling fluid therethrough, or they can have an external cooling channel system on their cooling surface 16a facing the holding frame 15, 15', in particular a flexible cooling channel system.

Figure 5:
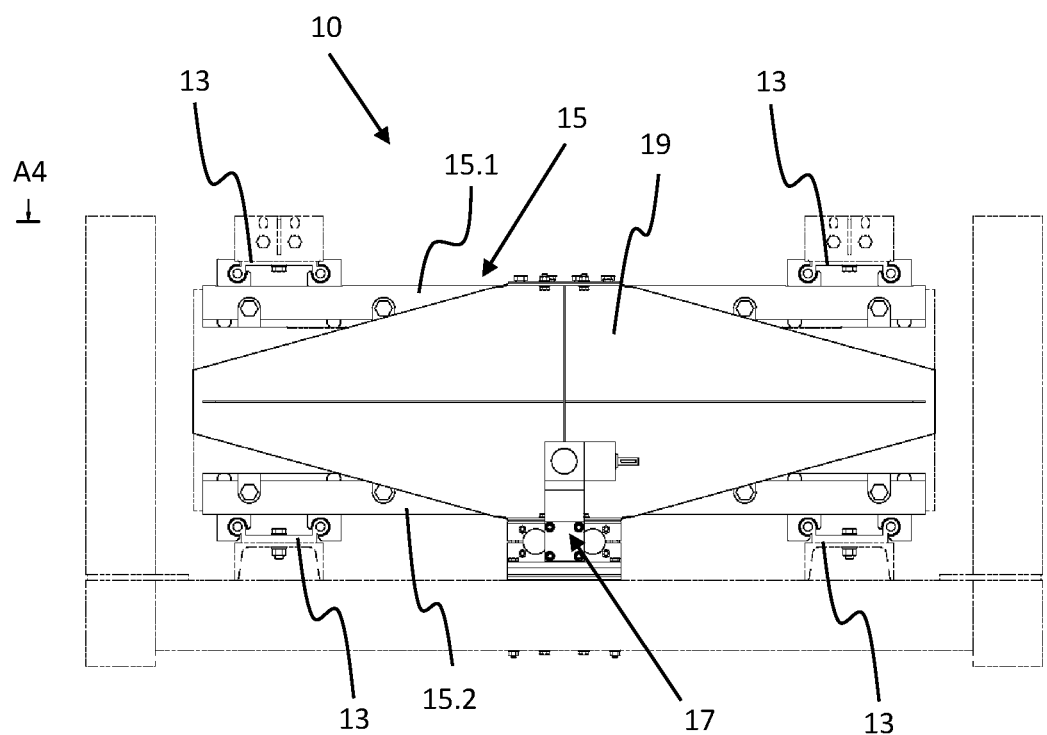
FIG. 5 shows a side view of the embodiment of FIG. 2.

FIG. 5 shows side view looking along the guiding rails 13. The field of view here is first on the spindle drive 17 and the moving plate 19. It can be seen that the guiding rails 13 form a load path for the arrangement of holding frames 15, 15', cooling plates 16 and battery modules 14.

Figure 6:
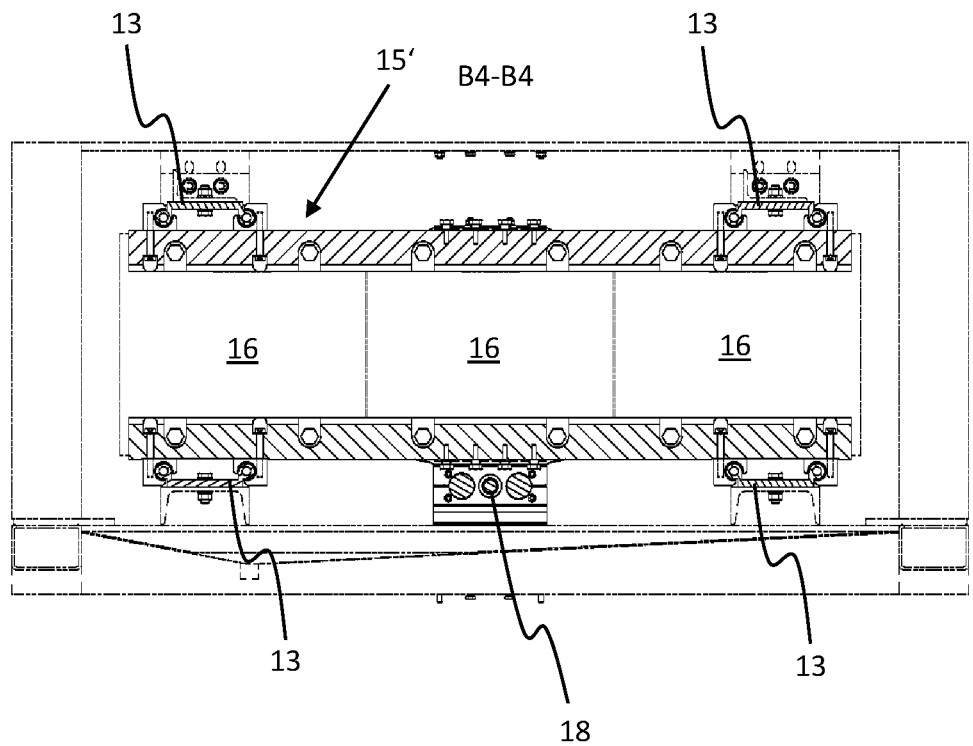
FIG. 6 shows a section along the line B4-B4 in FIG. 3.

FIG. 6 shows a sectional view along the line B4-B4 in FIG. 3. Here, on the one hand, the drive spindle 18 is clearly visible. It is also clear that for each holding frame, in particular the fixed holding frame 15' shown in FIG. 6, there can be several cooling plates 16—in this case three, which are arranged next to each other in a direction transverse to the guiding rails 13. The invention is not limited to a particular number of cooling plates 16 per holding frame. In deviation from the illustration, it is also possible to provide associated cooling plates 16 on both sides of a holding frame 15, which can come into contact with a battery module 14 from both sides.

The use of three (or any other number of) cooling plates 16 can be advantageous, because a preferred internal design may group the battery cells within the individual battery modules 14 in three (or any other number of) main portions, too. It can then make a difference in cooling performance whether one supplies each of the cooling plates 16 separately with a coolant fluid (parallel connection), or in series. For instance, in the case of three cooling plates 16, each cooling plate 16 may receive 10 l/min of volume flow, which flow from the cooling plate 16 back to a corresponding tank, or a volume flow of 30 l/min may flow through the first cooling plate 16, then the second, and so forth. In summary, one can use this feature for to optimize the cooling performance. Furthermore, manufacturing of such cooling plates 16 can be a factor, since it can be more difficult to find a supplier for bigger cooling plates 16.

Figure 7:
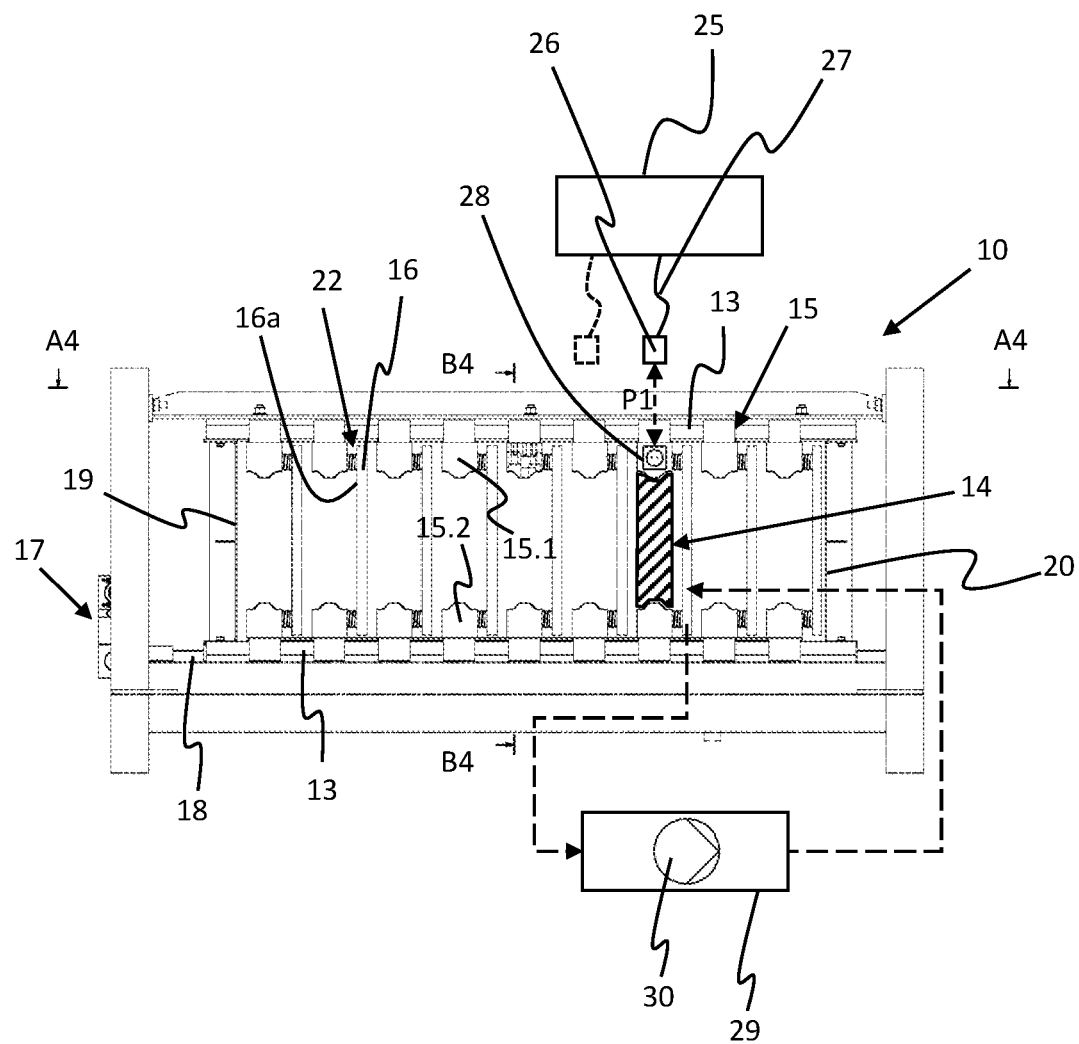
FIG. 7 shows an embodiment of the battery charging station according to the invention.

Finally, FIG. 7 shows further components according to embodiments of the present invention, starting from a representation as in FIG. 3.

In particular, reference sign 14 now explicitly shows an example of a battery module that is designed approximately in the manner of a flat parallelepiped (or cuboid). At those end faces which face the retaining profile 15.1 or 15.2, the battery module 14 has an approximately M-shaped cross-section which interacts positively with an approximately V-shaped cross-section of the retaining profiles 15.1, 15.2, so that the battery module 14 can be pushed into the retaining frame 15 transversely to the guiding rails 13, but is held securely in the retaining frame 15 transversely thereto.

An electric charger for charging the battery module 14 is shown schematically at reference sign 25. An electrical connector (plug) 26 is connected to the charger 25 via a flexible cable 27, which is designed to cooperate with an electrical connection device (power socket) 28 on each holding frame 15, which is only explicitly shown for one holding frame 15 in FIG. 7. In an alternative embodiment, the power socket 28 can constitute a part of battery module 14 and can thus be completely independent from holding frame 15. When the electrical connector 26 is plugged into the electrical connection device 28 according to the double arrow P1, the battery module 14 accommodated in the holding frame 15 can be charged. There can be more than one connector (cf. drawing). If the cooling plates 16 make contact with lateral faces of said battery modules 14, which is not shown in FIG. 7 (which shows a disengaged state), the battery modules 14 can be cooled during the charging process.

Reference sign 29 also shows a reservoir for a cooling fluid together with corresponding conveying means (pump) 30, so that a cooling fluid can be supplied to the cooling plate 16 and also discharged from there. Advantageously, the corresponding circuit (compare the dashed arrows in FIG. 7) also includes a heat exchanger to recycle the cooling fluid, i.e., the heat exchanger cools down the cooling or coolant fluid to an intended inlet temperature (T_in) at the cooling plate 16 by dissipating waste heat (through a fan or the like), which is not explicitly shown in FIG. 7.

Advantageously, said circuit serves all cooling plates 16 with cooling fluid, while charger 25 can be used to charge all batteries 14 simultaneously.

The invention claimed is:

1. An adjustable structure for battery cooling, comprising:
   a plurality of holding frames extending parallel to each other, each said holding frame configured to hold at least one battery module, and define a frame plane with a plane normal vector (N1);
   a plurality of cooling plates extending parallel to each other, each said cooling plate for battery cooling, each said cooling plate having at least one cooling surface with a surface normal vector (N2) and arranged adjacent to a corresponding holding frame from said plurality of holding frames, and said surface normal (N2) vector extending parallel to said plane normal vector (N1); and
   a moving mechanism including a screw or spindle drive having a driving motor and a lead screw or spindle, said lead screw or spindle being drive-coupled to said plurality of cooling plates and said plurality of holding frames, and configured to:
      move at least one said cooling plate and said corresponding holding frame relative to one another in a direction parallel or anti-parallel to said plane normal vector (N1) and to said surface normal vector (N2); and
      movably arrange the at least one said cooling plate and said corresponding holding frame within an external frame assembly relative to at least one other said cooling plate and said corresponding holding frame while holding the at least one said cooling plate against at least one of said corresponding holding frame or one said battery module that is held by said corresponding holding frame.

2. The structure of claim 1, said moving mechanism being configured to move at least one of said plurality of cooling plates or said plurality of holding frames relative to each other in a direction parallel to said surface normal vector (N2) to change a distance between neighbouring ones of at least one of said plurality of cooling plates or neighbouring ones of said plurality of holding frames.

3. The structure of claim 2, wherein respective neighbouring ones of the holding frames are interconnected by interconnecting means that have a hysteresis effect concerning a mechanical coupling between said neighbouring holding frames such that when one of said neighbouring holding frames is moved by the moving mechanism, the other one of said neighbouring holding frames follow a corresponding movement with a time delay; and said neighbouring holding frames are interconnected by at least one flexible element having some slack in a direction parallel to said surface normal vectors (N1, N2) or by at least one lug having an elongated hole, which hole is elongated in a direction parallel to said surface normal vectors (N1, N2).

4. The structure of claim 3, wherein:
at least one said holding frame of two outermost ones of said plurality of holding frames is connected to a respective outer plate by at least one of said interconnecting means; and
the moving mechanism directly acts on said outer plate.

5. The structure of any of claim 1, wherein each said holding frame is configured for slidably inserting therein a battery module in a direction transverse to said plane normal vector (N1), each said holding frame having a C-shape or a U-shape, so that the battery module is insertable between parallel free legs of said C-shape or U-shape of the holding frame.

6. The structure of claim 1, wherein each said cooling plate has an internal flow conduit for a fluid cooling medium or is equipped with a flow conduit for a fluid cooling medium on the at least one cooling surface facing said corresponding holding frame.

7. The structure of claim 1, wherein said moving mechanism is configured to move a first number of said holding frames from said plurality of holding frames to one side of the external frame assembly away from a fixed central holding frame among said plurality of holding frames and to move a second number of said holding frames from said plurality of holding frames to another side of the external frame assembly away from said fixed central holding frame among said plurality of holding frames, while not moving said central holding frame.

8. The structure of claim 1, wherein said lead screw or spindle has a first portion with a right-hand thread and a second portion with a left-hand thread; and a central one of said plurality of holding frames is located on said lead screw or spindle in a region between said first portion and said second portion.

9. The structure of claim 1, wherein each said cooling plate is attached to said corresponding holding frame by a spring mechanism that is configured for separating said cooling plate from said holding frame in a disengaged state of said moving mechanism, and in said disengaged state each said cooling plate is at least one of not held against said corresponding holding frame or against a battery module that is held by said corresponding holding frame.

10. The structure of claim 1, further comprising at least one electrical connector for charging of batteries, said electrical connector being configured as a flexible cable connector.

11. The structure of claim 1, wherein each said holding frame is arranged on at least one guiding rail, said at least one guiding rail being attached to the external frame assembly.

12. A battery charging station, comprising at least one said structure as claimed in claim 1, wherein said battery charging station is configured to charge at least one battery module held by the at least one said structure.

13. The battery charging station of claim 12, further comprising:
each said cooling plate including an internal flow conduit for a fluid cooling medium or being equipped with a flow conduit for a fluid cooling medium on the at least one cooling surface facing said corresponding holding frame; and
a reservoir of cooling fluid in fluid connection with the internal flow conduit or the flow conduit.

14. The battery charging station of claim 12, wherein the at least one battery module has a complementary engaging structure, said complementary engaging structure being complementary to an engaging structure of each said holding frame.

15. The battery charging station of claim 14, wherein said plurality of holding frames, are C-shaped holding frames and have parallel free legs, and said complementary engaging structure engages between said parallel free legs.

16. The structure of claim 1, further comprising said frame assembly.

17. The structure of claim 16, further comprising a battery charging station configured to charge at least one battery module held by said adjustable structure.

18. The structure of claim 17, wherein at least one of:
the at least one battery module has a complementary engaging structure, said complementary engaging structure being complementary to an engaging structure of each said holding frame of said adjustable structure; or
each said holding frames of said adjustable structure are C-shaped holding frames and have parallel free legs, and said complementary engaging structure engages between said parallel free legs.

19. A system for battery cooling, the system comprising:
an external frame assembly, the external frame assembly having an adjustable structure, the adjustable structure comprising:
a plurality of holding frames extending parallel to each other, each said holding frame configured to hold at least one battery module, and define a frame plane with a plane normal vector (N1);
a plurality of cooling plates extending parallel to each other, each said cooling plate for battery cooling, each said cooling plate having at least one cooling surface with a surface normal vector (N2) and arranged adjacent to a corresponding holding frame from said plurality of holding frames and said surface normal (N2) vector extending parallel to said plane normal vector (N1); and
a moving mechanism including a screw or spindle drive having a driving motor and a lead screw or spindle, said lead screw or spindle being drive-coupled to said plurality of cooling plates and said plurality of holding frames, and configured to:
move at least one said cooling plate and said corresponding holding frame relative to one another in a direction parallel or anti-parallel to said plane normal vector (N1) and to said surface normal vector (N2); and
movably arrange the at least one said cooling plate and said corresponding holding frame within the external frame assembly relative to at least one other said cooling plate and said corresponding holding frame including to move a first number of said holding frames from said plurality of holding frames to one side of the external frame assembly away from a fixed central holding frame among said plurality of holding frames and to move a second number of said holding frames from said plurality of holding frames to another side of the external frame assembly away from said fixed central holding frame among said plurality of holding frames, while not moving said central holding frame.

20. The system of claim 19, further comprising:
a battery charging station configured to charge at least one battery module of said adjustable structure.

* * * * *